(12) United States Patent
Hallberg et al.

(10) Patent No.: US 11,374,359 B2
(45) Date of Patent: Jun. 28, 2022

(54) HIGH VOLTAGE ELECTRICAL CONNECTOR

(71) Applicant: Ningbo Geely Automobile Research & Development Co., Ltd., Ningbo (CN)

(72) Inventors: Linus Hallberg, Säve (SE); Anders Eklund, Gothenburg (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 0 days.

(21) Appl. No.: 17/107,449

(22) Filed: Nov. 30, 2020

(65) Prior Publication Data
US 2021/0083428 A1 Mar. 18, 2021

Related U.S. Application Data

(63) Continuation of application No. PCT/CN2019/086101, filed on May 9, 2019.

(30) Foreign Application Priority Data

Jun. 5, 2018 (EP) .................................... 18176048

(51) Int. Cl.
*H01R 11/30* (2006.01)
*H01R 13/629* (2006.01)
(Continued)

(52) U.S. Cl.
CPC ... *H01R 13/62955* (2013.01); *H01R 13/6205* (2013.01); *H01R 13/641* (2013.01); *H01R 13/7175* (2013.01)

(58) Field of Classification Search
CPC .. B60D 1/62; H01R 13/6205; H01R 13/6315; H01R 13/6397; H01R 13/6275;
(Continued)

(56) References Cited

U.S. PATENT DOCUMENTS 3,182,280 A * 5/1965 Daut .................... H01R 13/443
439/378
4,061,409 A * 12/1977 Bealmear ............... H01R 13/20
439/372
(Continued)

FOREIGN PATENT DOCUMENTS

CN 201741933 U 2/2011
CN 103368223 A 10/2013
(Continued)

OTHER PUBLICATIONS

International Search Report and Written Opinion from corresponding International Application No. PCT/CN2019/086101, dated Aug. 13, 2019, 9 pages.

*Primary Examiner* — Thanh Tam T Le
(74) *Attorney, Agent, or Firm* — Tucker Ellis LLP

(57) ABSTRACT

A high voltage electrical connector for electric current connections in vehicles includes a first connector unit and a complementary second connector unit releasably connectable with the first connector unit. A primary locking member is arranged in the first connector unit, and a stationary locking part is arranged in the second connector unit, where the primary locking member is electromagnetically movable between a locked position and an unlocked position. In the locked position, the primary locking member is in locking engagement with the stationary locking part preventing the first connector unit and the second connector unit from being released from each other, and in the unlocked position the primary locking member is disengaged from the stationary locking part allowing the first connector unit and the second connector unit from being released from each other.

15 Claims, 4 Drawing Sheets

(51) Int. Cl.
  *H01R 13/62* (2006.01)
  *H01R 13/641* (2006.01)
  *H01R 13/717* (2006.01)

(58) Field of Classification Search
  CPC ............ H01R 13/62955; H01R 13/641; H01R 13/7175; Y02T 90/14
  See application file for complete search history.

(56) References Cited

U.S. PATENT DOCUMENTS

| | | | | |
|---|---|---|---|---|
| 5,316,493 | A * | 5/1994 | Sowers | H01R 13/6395 439/148 |
| 5,385,476 | A * | 1/1995 | Jasper | H01R 13/6633 439/38 |
| 5,401,179 | A * | 3/1995 | Shinchi | H01R 13/62955 439/372 |
| 5,474,461 | A * | 12/1995 | Saito | H01R 13/62933 439/351 |
| 5,609,494 | A * | 3/1997 | Yamaguchi | H01R 13/62933 439/157 |
| 5,997,320 | A * | 12/1999 | DeMello | H01R 13/5213 439/35 |
| 6,685,491 | B2 * | 2/2004 | Gergek | H01R 13/005 439/191 |
| 7,744,400 | B2 * | 6/2010 | Carmitchel | H01R 13/6275 439/369 |
| 7,950,943 | B2 * | 5/2011 | Ohtomo | B60L 53/11 439/299 |
| 8,262,402 | B2 * | 9/2012 | Gaul | B60L 53/66 439/304 |
| 8,951,060 | B2 * | 2/2015 | Meyer-Ebeling | B60L 53/16 320/109 |
| 9,744,866 | B2 * | 8/2017 | Murakami | H01R 13/6395 |
| 10,270,205 | B2 * | 4/2019 | Nishio | H01R 13/62955 |
| 10,476,203 | B2 * | 11/2019 | Oishi | H01R 13/627 |
| 2010/0228405 | A1 * | 9/2010 | Morgal | B60L 50/20 701/1 |
| 2015/0343915 | A1 | 12/2015 | Murakami | |

FOREIGN PATENT DOCUMENTS

| | | |
|---|---|---|
| CN | 105993100 A | 10/2016 |
| CN | 206628652 U | 11/2017 |
| CN | 206893915 U | 1/2018 |
| DE | 10056410 A1 | 5/2002 |
| DE | 10102242 A1 | 7/2002 |
| DE | 102011055963 A1 | 6/2013 |
| JP | 2013008465 A | 1/2013 |

* cited by examiner

HIGH VOLTAGE ELECTRICAL CONNECTOR

RELATED APPLICATION DATA

This application is a continuation of International Patent Application No. PCT/CN2019/086101, filed May 9, 2019, which claims the benefit of European Patent Application No. 18176048.9, filed Jun. 5, 2018, the disclosures of which are incorporated herein by reference in their entireties.

TECHNICAL FIELD

The present disclosure relates to a high voltage electrical connector for electric current connections in vehicles, comprising a first connector unit, a complementary second connector unit releasably connectable with the first connector unit.

BACKGROUND

High voltage electrical connectors are commonly used in vehicle applications where high voltage electric components are connected to each other, especially in new energy vehicles where the vehicles are partly or fully powered by electricity like for example battery electric vehicles or plug-in hybrid electric vehicles. The electrical connectors are used for securing that electric current can flow between the high voltage electric components in a safe way. When needed, parts of the electrical connector should be possible to be removed or disconnected from each other in order to break the electric circuit into which they are connected, for example during maintenance of the vehicle or when repairing the vehicle or parts of the vehicle. It is a well-known fact that high voltage electrical connectors can be hazardous when being operated and operators should always make sure that battery cells of the vehicle system are disconnected from the electric system before removing or disconnecting the electrical connector. A high voltage electrical connector should not be removed or disconnected while there is a high voltage present in the connector, since there is a high risk that the high voltage is producing dangerous amounts of electric current that is harmful to persons coming into contact with the electrical connector. One issue with today's high voltage electrical connectors is that it is difficult or even impossible to know if there is a high voltage present in the connector. Therefore, safety procedures have been established and used to ensure that the power of the vehicle system is shut down before removing or disconnecting the connector.

There is thus a need for an improved high voltage electrical connector, where the connector can be removed or disconnected in a safe way, and where the operator understands that there is no high voltage present in the electrical connector.

SUMMARY

An object of the present disclosure is to provide a high voltage electrical connector where the previously mentioned problems are avoided. This object is at least partly achieved by the features of the independent claims. The dependent claims contain further developments of the high voltage electrical connector.

The disclosure concerns a high voltage electrical connector for electric current connections in vehicles, comprising a first connector unit, a complementary second connector unit releasably connectable with the first connector unit. A primary locking member is arranged in the first connector unit, and a stationary locking part is arranged in the second connector unit, where the primary locking member is electromagnetically movable between a locked position and an unlocked position. In the locked position, the primary locking member is in locking engagement with the stationary locking part preventing the first connector unit and the second connector unit from being released from each other, and in the unlocked position the primary locking member is disengaged from the stationary locking part allowing the first connector unit and the second connector unit from being released from each other. The connector further comprises an auxiliary locking member mechanically movable between a first position and a second position, where in the first position the auxiliary locking member is in direct engagement with the primary locking member when the primary locking member is in the locked position, preventing the primary locking member from moving to the unlocked position, and in the first position the auxiliary locking member further is engaging the first connector unit and the second connector unit so that the first connector unit is prevented from being released from the second connector unit. In the second position the auxiliary locking member is disengaged from the primary locking member, allowing the primary locking member to move to the unlocked position.

Advantages with these features are that the connector can be removed or disconnected in a safe way for example during maintenance or service of the vehicle, and that an operator easily understands that there is no high voltage present in the electrical connector, where the high voltage can produce dangerous amounts of electric current being harmful to the operator if coming into contact with the electrical connector. The primary locking member secures that the connector cannot be opened when there is a high voltage present in the connector and the auxiliary locking member secures that the first connector unit and the second connector unit are mechanically secured to each other. The configuration with the auxiliary locking member further ensures that the first connector unit and the second connector unit stay put unless the auxiliary locking member is mechanically moved to the second position.

According to an aspect of the disclosure, the primary locking member is movable into the locked position when the high voltage is present in the connector, and the primary locking member is movable into the unlocked position when no high voltage is present in the connector. The primary locking member is preventing that the first connector unit and the second connector unit are disconnected or removed from each other when there is a high voltage present in the connector.

According to another aspect of the disclosure, the primary locking member comprises a locking arm and an electromagnet, where the electromagnet in an activated state is moving the locking arm from the unlocked position to the locked position, where the electromagnet is in the activated state when the high voltage is present in the connector. The electromagnet is providing a simple, reliable, and secure solution where the electromagnet can be powered with the electric current flowing through the connector when the high voltage is present in the connector.

According to a further aspect of the disclosure, the auxiliary locking member is pushing the locking arm in a direction towards the electromagnet. This feature ensures that the connector under normal operation is completely without moving parts since the auxiliary locking member is pushing the locking arm towards the electromagnet. When there is no high voltage present in the connector, the locking arm is still pushed towards the electromagnet preventing that the locking arm is moved to the unlocked position.

According to an aspect of the disclosure, the locking arm is pivotally arranged around a rotational axis, where the locking arm is pivoting around the rotational axis between the locked position and the unlocked position. This provides a simple and reliable construction for the locking arm.

According to other aspects of the disclosure, the electromagnet is attracting a first arm section of the locking arm arranged on a first side of the rotational axis when pivoting the locking arm from the unlocked position to the locked position, and the locking arm has a second arm section arranged on a second side of the rotational axis where the second arm section is arranged for engaging the stationary locking part in the locked position. The interaction between the first arm section and the electromagnet is used for moving the locking arm between the locked position and the unlocked position, and the second arm section secures through the engagement with the stationary locking part that the first connector unit and the second connector unit cannot be disconnected when there is a high voltage present in the connector.

According to another aspect of the disclosure, the primary locking member comprises a spring, where the spring is moving the locking arm from the locked position to the unlocked position. The spring provides a simple and reliable construction for moving the locking arm from the locked position to the unlocked position. When the high voltage present in the connector is cut off, and thus the high amount of electric current flowing through the connector is reduced, the attracting force from the electromagnet on the locking arm is lost and the spring can push the locking arm into the unlocked position.

According to a further aspect of the disclosure, the auxiliary locking member is extending through a first outer casing structure of the first connector unit and a second outer casing structure of the second connector unit. With this arrangement the auxiliary locking member is securing the first connector unit and the second connector unit to each other. In the first position the auxiliary locking member is engaging the first connector unit and the second connector unit so that the first connector unit is prevented from being released from the second connector unit.

According to an aspect of the disclosure, the auxiliary locking member is provided with a locking surface, where the locking surface is engaging the primary locking member in the first position. The locking surface is arranged for being in contact with the primary locking member when the auxiliary locking member is in the first position. The locking surface is preventing the primary locking member from moving to the unlocked position when the auxiliary locking member is in the first position, which further increases the safety of the connector.

According to another aspect of the disclosure, the locking surface is in direct engagement with the first arm section of the locking arm in the first position. In the first position, the locking surface of the auxiliary locking member is in direct engagement with the first arm section so that the first arm section is pushed by the auxiliary locking member towards the electromagnet. In this way it is ensured that the connector under normal operation is without moving parts since the auxiliary locking member is pushing the first arm section towards the electromagnet. When there is no high voltage present in the connector the locking arm is still pushed towards the electromagnet so that the locking arm is not moved to the unlocked position.

According to a further aspect of the disclosure, the auxiliary locking member is arranged as a security screw movable between the first position and the second position. A security screw is a simple and reliable construction and the security screw can be designed so that an operator must use a suitable tool for moving the security screw between the first and second positions. In this way a secure and tamper proof design is achieved.

According to an aspect of the disclosure, the stationary locking part is arranged as a locking protrusion or a locking groove in the second connector unit. The protrusion or groove is designed to match the second arm section of the locking arm and arranged for engaging the second arm section in the locked position in order to prevent that the first connector unit and the second connector unit are released or disconnected from each other.

According to another aspect of the disclosure, the connector is provided with a visual indicator indicating that the high voltage is present in the connector. The visual indicator is further increasing the safety of the connector since a visual indication that a high voltage is present in the connector is given to the operator. The visual indicator can be arranged in the first connector unit or in the second connector unit and powered with the electric current that is flowing through the connector when the high voltage present in the connector.

According to a further aspect of the disclosure, the visual indicator is a light emitting diode. A light emitting diode provides a simple and reliable construction of the visual indicator. The light emitting diode can be designed to be visible through the casing structures of the connector so that an operator can see the light from the visual indicator when the high voltage is present in the connector.

BRIEF DESCRIPTION OF THE DRAWINGS

The disclosure will be described in greater detail in the following, with reference to the attached drawings, in which.

REFERENCE SIGNS

Figure 1:
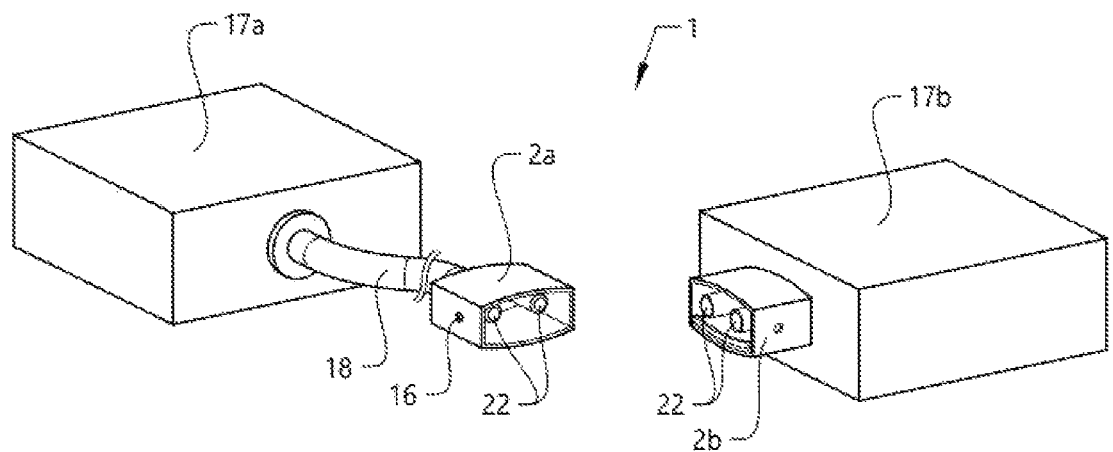
FIG. 1 shows schematically in a perspective view, a high voltage connector in a disconnected state according to the disclosure.

1: Connector
2a: First connector unit
2b: Second connector unit
3: Primary locking member
4: Stationary locking part
5: Auxiliary locking member
6: Locking arm
7: Electromagnet
8a: First arm section
8b: Second arm section
9a: First side
9b: Second side 10: Spring
11a: First outer casing structure
11b: Second outer casing structure
12: Locking surface
13: Screw
14: Locking protrusion
15: Locking groove
16: Visual indicator
17a: First high voltage electric component
17b: Second high voltage electric component
18: Electric cable
19: Locking bar
20a: Outer part of first arm section
20b: Outer part of second arm section
21: Spring holder
22: Conductor
23a: First hole
23b: Second hole
24: Coil
25: Core

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 2:
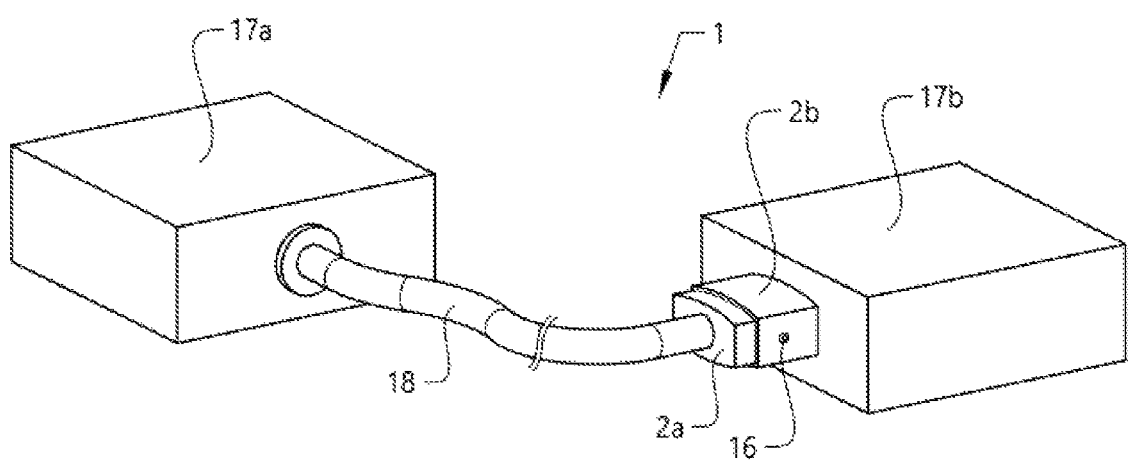
FIG. 2 shows schematically, in a perspective view, the high voltage connector in a connected state according to the disclosure.

FIGS. 1 and 2 schematically show in perspective views a high voltage connector 1 according to the disclosure. The high voltage connector 1 comprises a first connector unit 2a and a complementary second connector unit 2b. The first connector unit 2a and the second connector unit 2b are releasably connectable with each other. In FIG. 1 the first connector unit 2a and the second connector unit 2b are shown in a disconnected state, where the units are disconnected and separated from each other. In FIG. 2 the first connector unit 2a and the second connector unit 2b are shown in a connected state, where the units are connected to each other. The first connector unit 2a and the second connector unit 2b are forming the high voltage connector 1.

The high voltage connector 1 may for example be used as a service connector, where during maintenance, repair, or service of the vehicle the first connector unit 2a and the second connector unit 2b should be possible to be removed or disconnected from each other in order to break the electric circuit into which they are connected. During normal operation of the vehicle, the high voltage connector 1 is in the connected state securing that an electric current can flow through the connector.

The first connector unit 2a may be arranged in connection to a first high voltage electric component 17a, for example via an electric cable 18. In an alternative embodiment the first connector unit 2a may instead be directly attached to the first high voltage electric component 17a without the electric cable 18. The second connector unit 2b may be arranged in connection to a second high voltage electric component 17b. As shown in FIGS. 1 and 2, the second connector unit 2b is directly attached to the second high voltage electric component 17b, but in an alternative embodiment the second connector unit 2b may instead be connected to the second high voltage electric component 17b via a cable. The first connector unit 2a and the second connector unit 2b may have any suitable shapes or configurations where the units are releasably connectable with each other. When being connected, the first connector unit 2a and the second connector unit 2b may be designed so that they are held in place in relation to each other with frictional forces. In the embodiment shown in the figures, the first connector unit 2a has a first outer casing structure 11a and the second connector unit 2b has a second outer casing structure 11b.

With the expression high voltage for systems and components in vehicle applications is usually meant voltages in the range 60-1500 V DC or alternatively in the range 30-1000 V AC, which ranges are used for classification of systems and components within the automotive industry. Voltages below these ranges are referred to as low voltage systems or components.

The high voltage connector 1 may have a conventional plug and socket configuration as indicated in the figures, where the electric current can flow through the connector in one or more connected conductors 22 arranged inside the first connector unit 2a and the second connector unit 2b respectively. The one or more conductors 22 are for example connected to each other via plugs or inlets connected to receptacles or outlets. The high voltage connector may thus have a plug and socket configuration where the first connector unit 2a is a male connector unit and the second connector unit 2b is a female connector unit, as shown in the figures. Alternatively, the first connector unit 2a may instead be a female connector unit and the second connector unit 2b a male connector unit. Other suitable configurations are also possible, depending on the design of the high voltage connector 1, as long as the electric current can flow through the one or more conductors 22 arranged inside the connector units.

To provide a secure connection between the first connector unit 2a and the second connector unit 2b, a primary locking member 3 is arranged in the first connector unit 2a, and a stationary locking part 4 is arranged in the second connector unit 2b. The primary locking member 3 and the stationary locking part 4 are arranged to interact with each other to establish a primary locking function between the first connector unit 2a and the second connector unit 2b. The primary locking function will prevent that the first connector unit 2a is removed or disconnected from the second connector unit 2b while there is a high voltage present in the high voltage connector 1, that could result in a dangerous amount of electric current flowing through the connector. As an alternative, the primary locking member 3 may instead be arranged in the second connector unit 2b and the stationary locking part 4 in the first connector unit 2a. It should be understood that small amounts of electric current could flow in the connector even if no high voltage is present in the connector, depending on the configuration of the electric system of the vehicle.

Figure 4A:
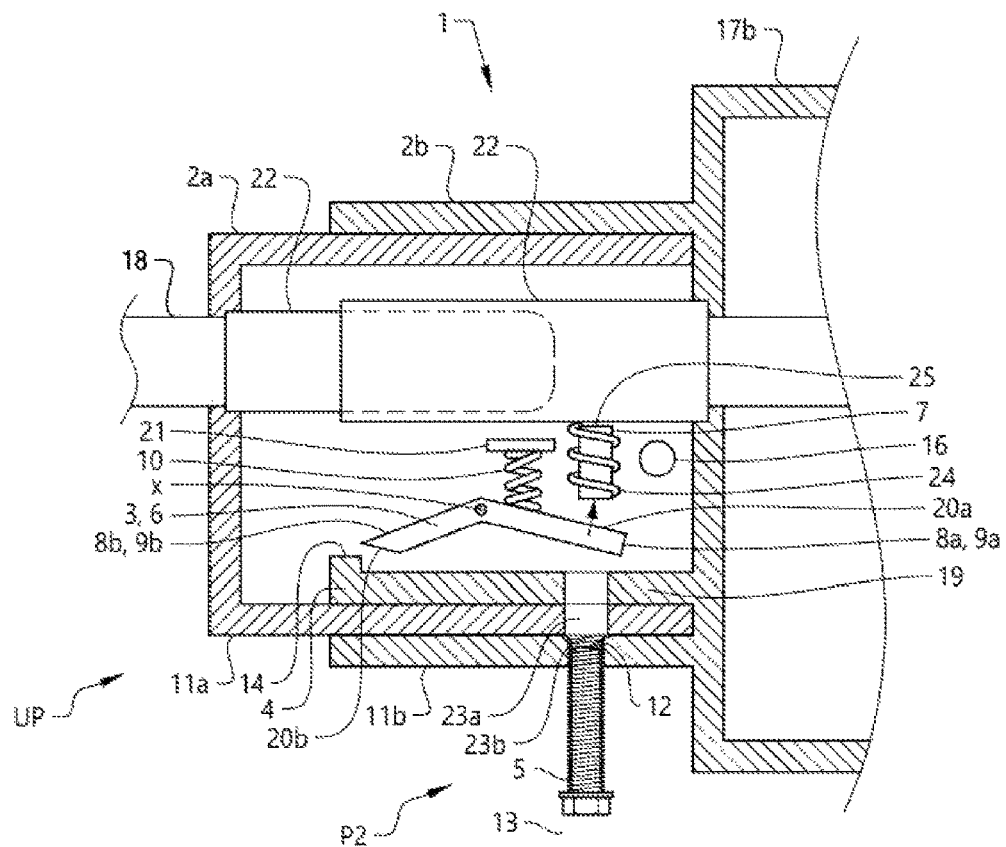
FIGS. 4A-4C show schematically, cross-sections of the high voltage connector in a connected state in different operational modes according to the disclosure.
Figure 4B:
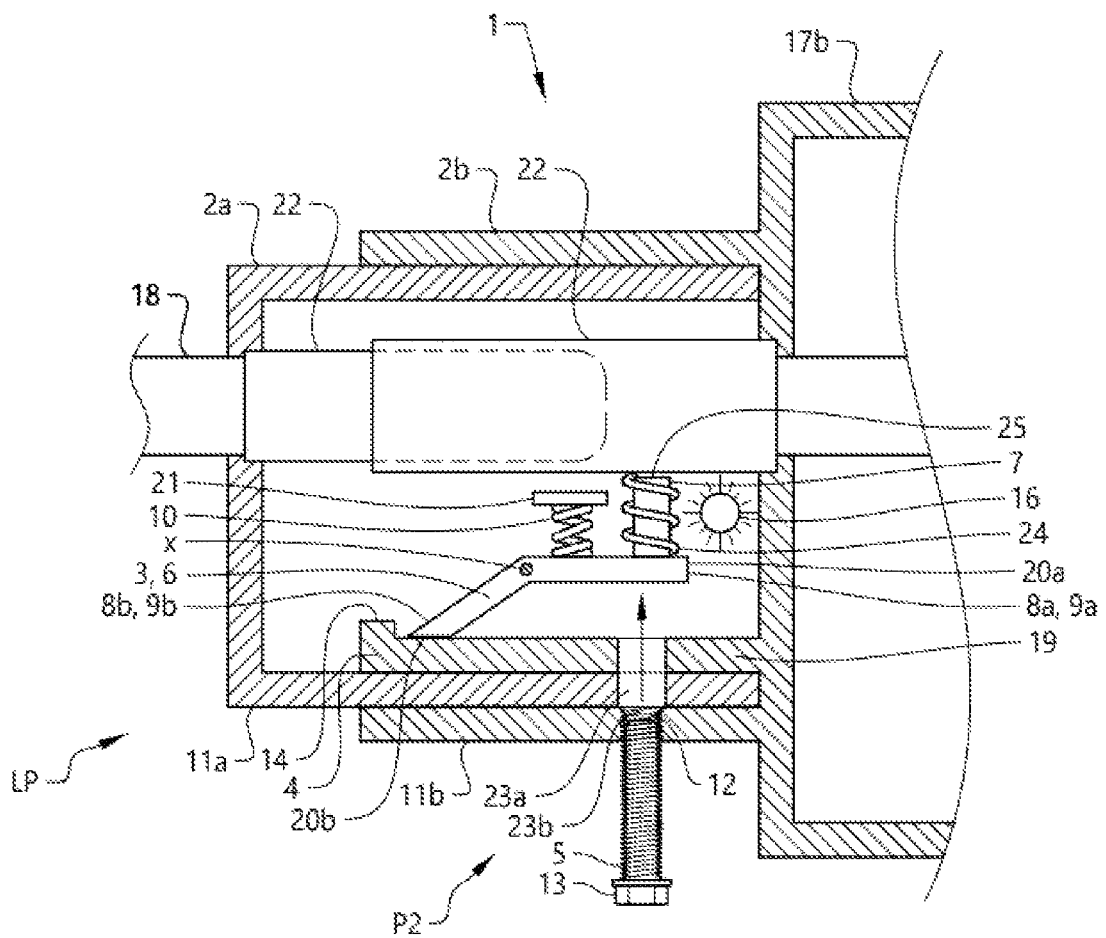
Figure 4C:
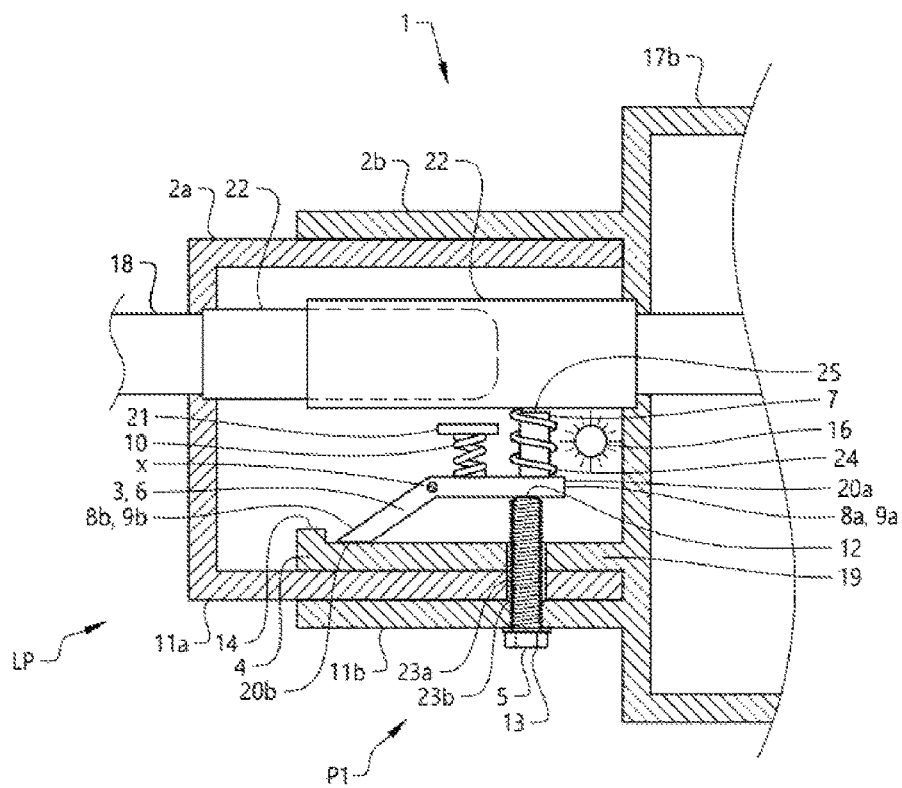

The primary locking member 3 is movable between an unlocked position UP, as shown in FIG. 4A, and a locked position LP, as shown in FIGS. 4B-4C. In the locked position LP, the primary locking member 3 is in locking engagement with the stationary locking part 4 preventing the first connector unit 2a and the second connector unit 2b from being released from each other. Thus, in the locked position, the first connector unit 2a and the second connector unit 2b are prevented from being removed or disconnected from each other through the locking engagement between the primary locking member 3 and the stationary locking part 4. In the unlocked position UP, the primary locking member 3 is disengaged from the stationary locking part 4 allowing the first connector unit 2a and the second connector unit 2b from being released from each other. In this way, the first connector unit 2a and the second connector unit 2b are not prevented from being removed or disconnected from each other in the unlocked position UP.

According to the disclosure, the primary locking member 3 is electromagnetically movable between the unlocked position UP and the locked position LP. By arranging the primary locking member 3 with an electromagnetically movable configuration, the primary locking member 3 can be powered with the electric current that is flowing in the one or more conductors 22 through the high voltage connector 1, as will be further described below, and therefore no additional power system for the primary locking member 3 is needed.

As shown in FIGS. 3 and 4A-4C, the primary locking member 3 comprises a locking arm 6 and an electromagnet 7. The electromagnet 7 is in an activated state moving the locking arm 6 from the unlocked position UP, as shown in FIG. 4A, to the locked position LP, as shown in FIGS. 4B-4C. The electromagnet 7 is configured so that it is in the activated state when the high voltage is present in the high voltage connector and an electric current is flowing through the electromagnet 7. The electromagnet 7 is in a deactivated state when no high voltage is present in the high voltage connector 1. The electromagnet 7 can in this way be powered with the electric current that is flowing in the one or more conductors 22 through the high voltage connector 1.

The electromagnet 7 used may have any suitable traditional configuration where a magnetic field is produced by an electric current, and where the magnetic field disappears when the electric current is turned off. The electromagnet 7 may comprise a coil 24 that is wrapped around a core 25 of a suitable material. The core 25 may for example be made of iron or other ferromagnetic materials. The strength of the generated magnetic field can be designed through the use of a suitable structure of the core 25, the number of windings of the coil 24, and the strength of the electric current flowing through the coil 24. For electromagnets, the strength of the generated magnetic field is usually proportional to the amount of electric current through the windings of the coil. The use of an electromagnet is suitable for the primary locking member 3, since the magnetic field can be quickly changed by controlling the amount of electric current. In this way, the primary locking member can quickly change from the unlocked position UP to the locked position LP when the high voltage is present in the high voltage connector 1, and from the locked position LP to the unlocked position UP when no high voltage is present in the high voltage connector 1.

As described above, the primary locking member 3 is thus movable into the locked position LP when the high voltage is present in the connector 1, and the primary locking member 3 is movable into the unlocked position UP when no high voltage is present in the connector 1.

As shown in FIGS. 3, 4A-4C, the locking arm 6 is pivotally arranged around a rotational axis X. Through this arrangement the locking arm 6 may pivot around the rotational axis X between the locked position LP and the unlocked position UP. The locking arm 6 has a first arm section 8a arranged on a first side 9a of the rotational axis X, and the locking arm 6 has a second arm section 8b arranged on a second side 9b of the rotational axis X.

As shown in FIGS. 4B-4C, the electromagnet 7 is in the activated state attracting the first arm section 8a of the locking arm 6 arranged on the first side 9a of the rotational axis X when pivoting the locking arm 6 from the unlocked position UP to the locked position LP. The first arm section 8a or a part of the first arm section 8a is made of a suitable material that can be attracted by the electromagnet 7. Examples of suitable materials are ferromagnetic materials such as iron, nickel and cobalt. The dimension of the electromagnet 7 and the ferromagnetic materials are designed so that the electromagnet easily can attract the first arm section 8a when the electromagnet is activated. As shown in the figures, the electromagnet 7 is arranged so that it is attracting an outer part 20a of the first arm section 8a in the activated state. With this configuration at least the outer part 20a of the first arm section 8a should be made of a ferromagnetic material.

Figure 5:
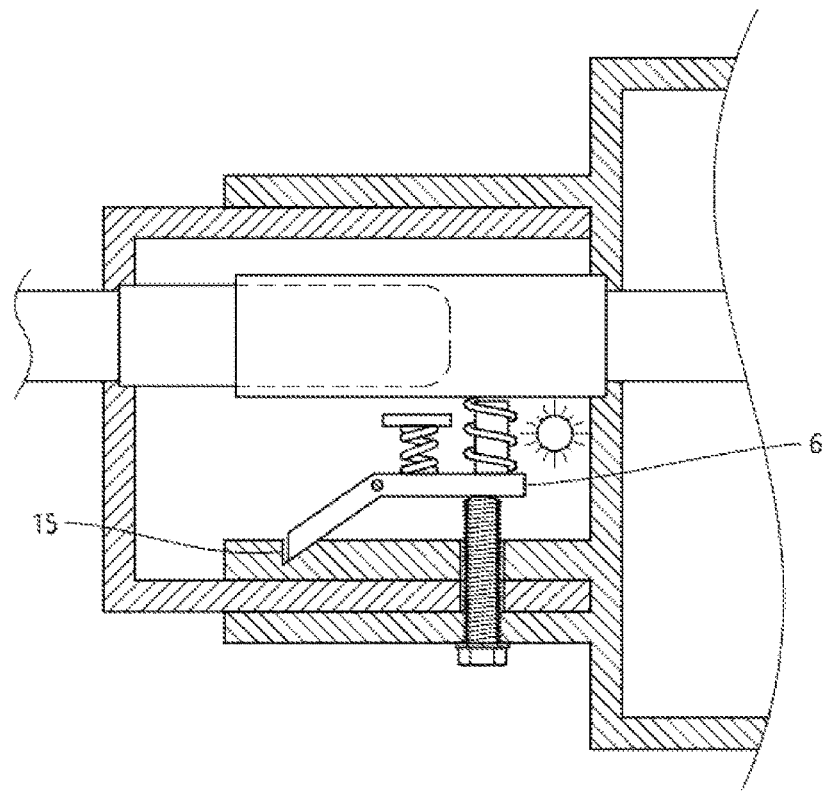
FIG. 5 shows schematically, a cross-section of an alternative embodiment of the high voltage connector in a connected state according to the disclosure.

As further shown in FIGS. 3, 4A-4C and 5, the second arm section 8b of the locking arm 6 is arranged for engaging the stationary locking part 4 in the locked position LP. The stationary locking part 4 may for example be arranged in the second connector unit 2b as a locking protrusion 14, as shown in FIGS. 3 and 4A-4C, or a locking groove 15, as shown in FIG. 5. The locking protrusion 14 may for example be arranged on a locking bar 19 that is arranged inside the second outer casing structure 11b. The locking protrusion is formed as an outer part of the locking bar 19, and the locking protrusion 14 is extending in a direction inwards from the locking bar 19, and is adapted for engaging an outer part 20b of the second arm section 8b. The locking protrusion 14 may have other configurations if desired depending on the design of the stationary locking part 4 and the locking protrusion 14 can instead be arranged on other parts of the second connector unit 2b. As described above, the stationary locking part 4 may be arranged as a locking groove 15. Also the locking groove 15 may be arranged on the locking bar 19. The locking groove 15 may be configured as a recess or track that is adapted for engaging the outer part 20b of the second arm section 8b. Alternatively, the locking groove 15 can be arranged on other parts of the second connector unit 2b.

The primary locking member 3 may further comprise a spring 10. The spring 10 according to the embodiment in FIGS. 3, 4A-4C and 5, is compressed when the electromagnet 7 is activated and the locking arm 6 is moving from the unlocked position UP to the locked position LP. When the electromagnet 7 is deactivated and no high voltage is present in the high voltage connector 1, the spring 10 is moving the locking arm 6 from the locked position LP to the unlocked position UP. The spring 10 may have any suitable configuration, such as for example a helical compression spring. Other suitable spring types may be leaf springs or torsion springs. In an alternative embodiment, the spring 10 may instead be arranged as an extension spring.

In the position shown in FIGS. 3, 4A-4C and 5, the primary locking member 3 is arranged in the lower part of the first connector unit 2a inside the first outer casing structure 11a. The locking arm 6 is pivotally arranged around the rotational axis X, so that the locking arm can pivot around the rotational axis X between the locked position LP and the unlocked position UP. The locking arm 6 can be made of any suitable material, such as for example metals, plastic materials, composite materials or combinations of different materials. The locking arm can be manufactured in one single piece of material or assembled from two or more parts. As shown in the figures, the first arm section 8a is arranged at an angle in relation to the second arm section 8b, and in this way the locking arm 6 has an angled configuration. It should, however, be understood that the locking arm 6 may have other suitable configurations, such as for example curved or straight.

As further shown in the position in FIGS. 3, 4A-4C and 5, the spring 10 is arranged between a spring holder 21 and the first arm section 8a. The spring holder 21 is arranged above the first arm section 8a. An upper end of the spring 10 may be fastened to the spring holder 21 and a lower end to the first arm section 8a with suitable fastening means.

Figure 3:
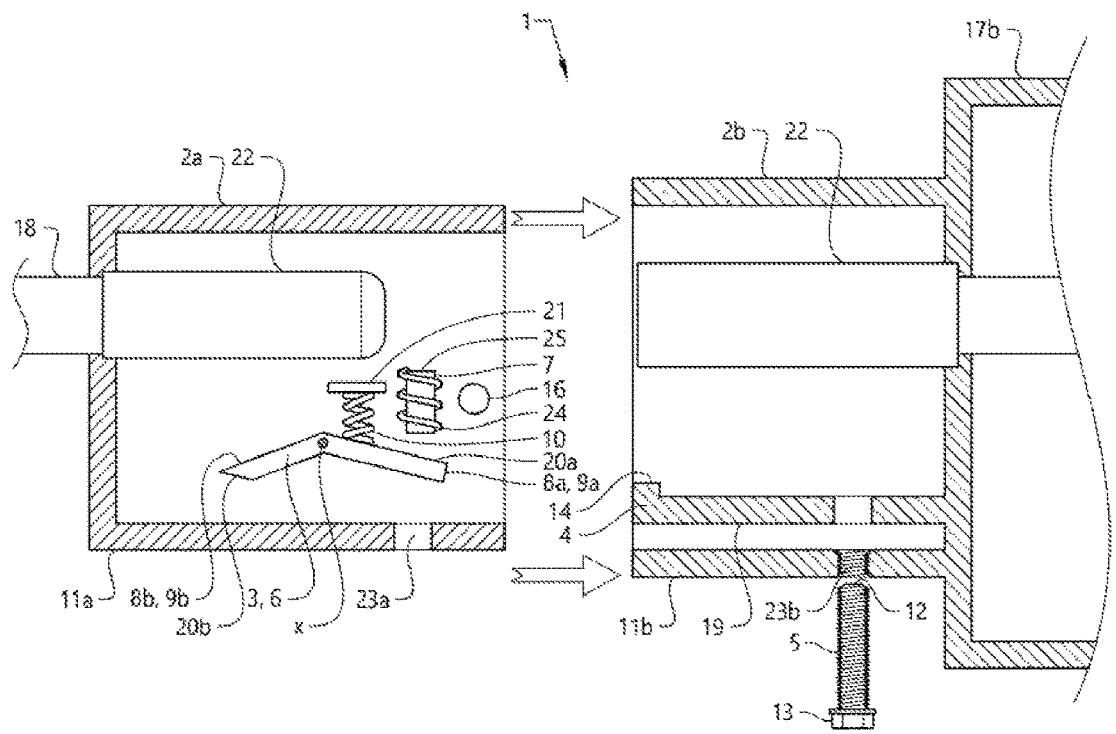
FIG. 3 shows schematically, a cross-section of the high voltage connector in a disconnected state according to the disclosure.

In FIGS. 3 and 4A, the locking arm 6 is in the unlocked position UP. When the electromagnet 7 is activated, the locking arm 6 is pivoting around the rotational axis X from the unlocked position UP to the locked position LP. The locked position LP is shown in FIGS. 4B-4C. When the locking arm 6 is moving from the unlocked position UP to the locked position LP according to the embodiment shown in the figures, the locking arm 6 is pivoting in a counter clockwise direction, and the first arm section 8a is rotating in a direction upwards towards the electromagnet 7. When the locking arm 6 is rotating from the unlocked position UP to the locked position LP, the spring 10 is loaded, since in this embodiment the attracting force from the electromagnet 7 on the locking arm 6 is strong enough to both move the locking arm 6 and compress the spring 10. The spring 10 is thus loaded with the force acting on the locking arm 6 by the electromagnet 7. When the electromagnet 7 is deactivated, the locking arm 6 is pivoting around the rotational axis X from the locked position LP to the unlocked position UP. When the locking arm 6 is moving from the locked position LP to the unlocked position UP according to the embodiment shown in the figures, the locking arm 6 is through action from the spring 10 pivoting in a clockwise direction, and the first arm section 8a is rotating in a direction downwards away from the electromagnet 7. Thus, when the locking arm 6 is rotating from the locked position LP to the unlocked position UP, the spring is decompressed. The first connector unit 2a may be provided with a stopping member that is preventing that the first arm section 8a is rotating too far away from the electromagnet 7. The distance between the electromagnet 7 and the first arm section 8a in the unlocked position is selected so that the electromagnet 7 easily can attract the first arm section when being activated. In alternative embodiments, the locking arm 6 may be designed so that it is rotating in different directions than the ones described above depending on the primary locking member. In other embodiments or in other positions of the connector than the embodiment and position described above and shown in the figures, the primary locking member 3 can depending on the construction be arranged or located in other suitable positions of the first or second connector units.

In the position shown in FIGS. 3, 4A-4C and 5, the stationary locking part 4 is arranged in the lower part of the second connector unit 2b inside the second outer casing structure 11b. In FIGS. 3 and 4A, the locking arm 6 is in the unlocked position UP. When the electromagnet 7 is activated, the locking arm 6 is pivoting around the rotational axis X from the unlocked position UP to the locked position LP. The locked position LP is shown in FIGS. 4B-4C. When the locking arm 6 is moving from the unlocked position UP to the locked position LP according to the embodiment shown in the figures, the locking arm 6 is pivoting in a counter clockwise direction, and the second arm section 8b is rotating in a direction downwards towards the stationary locking part 4. In the locked position, the second arm section 8b is engaging the stationary locking part 4 preventing the first connector unit 2a from being removed or disconnected from the second connector unit 2b. When the electromagnet 7 is deactivated, the locking arm 6 is pivoting around the rotational axis X from the locked position LP to the unlocked position UP. When the locking arm 6 is moving from the locked position LP to the unlocked position UP according to the embodiment shown in the figures, the locking arm 6 is pivoting in a clockwise direction, and the second arm section 8b is rotating in a direction upwards away from the stationary locking part 4. In other embodiments or in other positions of the connector than the embodiment and position described above and shown in the figures, the stationary locking part 4 can depending on the construction be arranged or located in other suitable positions of the first or second connector units.

The high voltage connector 1 further comprises an auxiliary locking member 5. The auxiliary locking member 5 is arranged as an additional security feature of the connector that also is prolonging the lifetime and reliability of the connector. The auxiliary locking member 5 is thus establishing an auxiliary locking function between the first connector unit 2a and the second connector unit 2b, where the first connector unit 2a and the second connector unit 2b cannot be removed or disconnected from each other when the auxiliary locking member 5 is activated. Through the auxiliary locking member 5, the connector can further be constructed so that during normal operation when the connector is in the connected state and the auxiliary locking member is activated, the connector is operated without any moving parts, which will prolong the lifetime and reliability of the connector.

The auxiliary locking member 5 is mechanically movable between a first position P1 and a second position P2. The first position P1 is illustrated in FIG. 4C and the second position P2 is illustrated in FIGS. 4A-4B. As shown in FIG. 4C, the auxiliary locking member 5 is in the first position P1 in direct engagement with the primary locking member 3 when the primary locking member 3 is in the locked position LP. The auxiliary locking member 5 is in this way preventing the primary locking member 3 from moving to the unlocked position UP. In the first position P1 the auxiliary locking member 5 is further engaging the first connector unit 2a and the second connector unit 2b so that the first connector unit 2a is prevented from being released from the second connector unit 2b. In the second position P2, as shown in FIGS. 4A-4B, the auxiliary locking member 5 is disengaged from the primary locking member 3, allowing the primary locking member 3 to move to the unlocked position UP.

As shown in FIG. 4C, the auxiliary locking member 5 is arranged so that it is engaging the first arm section 8a of the locking arm 6 and pushing the first arm section 8a of the locking arm 6 in a direction towards the electromagnet 7. In this way the auxiliary locking member 5 is holding the locking arm 6 in the locked position LP. When the auxiliary locking member 5 is pushing the first arm section in a direction towards or in contact with the electromagnet 7, the locking arm 6 is prevented from pivoting around the rotational axis X and the second arm section 8b is prevented from being disengaged from the stationary locking part 4. To secure that the auxiliary locking member 5 is engaging the first arm section 8a in a reliable and efficient way, the auxiliary locking member 5 can be provided with a locking surface 12, where the locking surface 12 is engaging the primary locking member 3 in the first position P1. The locking surface 12 is arranged so that it is in direct engagement with the first arm section 8a of the locking arm 6 in the first position P1.

The auxiliary locking member 5 is in the embodiment shown in the figures arranged as a threaded security screw 13 movable between the first position P1 and the second position P2. By using a suitable tool the security screw 13 can be screwed into the first position P1 and unscrewed into the second position P2. The second outer casing structure 11b is provided with a second hole 23b that can be threaded for holding the threaded security screw 13. The first outer casing structure 11a is provided with a first hole 23a or opening that can be threaded or non-threaded, where the first hole 23a is receiving the security screw 13 when the security screw 13 is screwed into the first position P1 from the second position P2. When the security screw is moved from the second position P2 to the first position P1, the security screw will run into the first hole 23a of the first outer casing structure 11a, which is preventing that the first connector unit 2a and the second connector unit 2b can be removed or disconnected from each other. The tip of the security screw 13 can be arranged as the locking surface 12 that is engaging the first arm section 8a. In the embodiment shown in the figures, the upper end part of the security screw 13 is forming the locking surface 12. Thus, the auxiliary locking member 5 is in the first position P1 extending through the first outer casing structure 11a of the first connector unit 2a and the second outer casing structure 11b of the second connector unit 2b.

To even further secure that the high voltage connector is not being disconnected when there is a high voltage present in the connector, the connector 1 is provided with a visual indicator 16 indicating that the high voltage is present in the connector 1. As an example, the visual indicator 16 can be a light emitting diode (LED) that is visible through the casing structures of the connector so that an operator can see the light from the visual indicator when the high voltage is present in the connector. The visual indicator 16 can be arranged in the first connector unit 2a or in the second connector unit 2b and powered with the electric current that is flowing in the one or more conductors 22 through the high voltage connector 1 when the high voltage is present in the connector. It would also be possible to use two or more visual indicators arranged in in the first connector unit 2a and/or in the second connector unit 2b.

The primary locking function and the auxiliary locking function described above are ensuring that the parts of the connectors are prevented from being removed or disconnected from each other when there is a high voltage present in the connector. The configuration with the security screw 13 is securing that the connector units stay put unless a tool is used for unscrewing the security screw 13. It also ensures that the connector in normal operation is operated without moving parts since the security screw pushes against the force of the spring so that the first arm section 8a is pushed in a direction towards the electromagnet 7.

In FIG. 3 the high voltage connector 1 is shown in the disconnected state, where the first connector unit 2a and the second connector unit 2b are disconnected and separated from each other. When connecting the connector, the first connector part 2a and the second connector part 2a are arranged in relation to each other so that the first connector unit 2a and the second connector unit 2b are connected to each other. This can be achieved for example by pushing one of the connector units into the other connector unit or by pushing the connector units towards each other. In FIG. 4A the connector is shown in the connected state where the locking arm 6 is in the unlocked position UP. When a high voltage is present in the connector, the locking arm 6 is moved from the unlocked position UP to the locked position LP, which is shown in FIG. 4B. In FIGS. 4A-4B the security screw 13 is in the second position P2. In FIG. 4C the locking screw has been moved from the second position P2 to the first position P1 and the connector is in this state fully secured through the primary locking function and the auxiliary locking function. When a high voltage is present in the connector, the visual indicator 16 is activated. It is possible to first connect the connector units and then move the security screw to the first position P1 as shown in FIG. 4C before activating the electromagnet 7. The security screw 13 will push the first arm section 8a towards the electromagnet into the locked position LP, and in this way the connector can be connected and fully secured without any high voltage present in the connector. When a high voltage is present in the connector the locking arm will already be in the locked position LP since the security screw 13 is pushing the locking arm 6 into the locked position LP, and when no high voltage is present in the connector the security screw 13 ensures that the locking arm 6 is in the locked position LP. Through this arrangement, the locking arm 6 is not pivoting between the locked and unlocked positions since the security screw 13 is ensuring that the connector in normal operation is operated without moving parts.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A high voltage electrical connector for electric current connections in vehicles, comprising a first connector unit, a complementary second connector unit releasably connectable with the first connector unit, a primary locking member arranged in the first connector unit, and a stationary locking part arranged in the second connector unit, where the primary locking member is electromagnetically movable between a locked position and an unlocked position, where in the locked position, the primary locking member is in locking engagement with the stationary locking part preventing the first connector unit and the second connector unit from being released from each other, where in the unlocked position, the primary locking member is disengaged from the stationary locking part allowing the first connector unit and the second connector unit from being released from each other, wherein the electrical connector further comprises an auxiliary locking member mechanically movable between a first position and a second position, where in the first position, the auxiliary locking member is in direct engagement with the primary locking member when the primary locking member is in the locked position, preventing the primary locking member from moving to the unlocked position, and in the first position, the auxiliary locking member further is engaging the first connector unit and the second connector unit so that the first connector unit is prevented from being released from the second connector unit, and where in the second position, the auxiliary locking member is disengaged from the primary locking member, allowing the primary locking member to move to the unlocked position.

2. The high voltage electrical connector according to claim 1,
wherein the primary locking member is movable into the locked position when a high voltage is present in the connector, and
where the primary locking member is movable into the unlocked position when no high voltage is present in the connector.

3. The high voltage electrical connector according to claim 1,
wherein the primary locking member comprises a locking arm and an electromagnet, where the electromagnet in an activated state is moving the locking arm from the unlocked position to the locked position, where the electromagnet is in the activated state when the high voltage is present in the connector.

4. The high voltage electrical connector according to claim 3,
wherein the auxiliary locking member is pushing the locking arm in a direction towards the electromagnet.

5. The high voltage electrical connector according to claim 3,
wherein the locking arm is pivotally arranged around a rotational axis, where the locking arm is pivoting around the rotational axis between the locked position and the unlocked position.

6. The high voltage electrical connector according to claim 5,
wherein the electromagnet is attracting a first arm section of the locking arm arranged on a first side of the rotational axis when pivoting the locking arm from the unlocked position to the locked position.

7. The high voltage electrical connector according to claim 5,
wherein the locking arm has a second arm section arranged on a second side of the rotational axis, where the second arm section is arranged for engaging the stationary locking part in the locked position.

8. The high voltage electrical connector according to claim 3,
wherein the primary locking member comprises a spring, where the spring is moving the locking arm from the locked position to the unlocked position.

9. The high voltage electrical connector according to claim 1,
wherein the auxiliary locking member is extending through a first outer casing structure of the first connector unit and a second outer casing structure of the second connector unit.

10. The high voltage electrical connector according to claim 1,
wherein the auxiliary locking member is provided with a locking surface, where the locking surface is engaging the primary locking member in the first position.

11. The high voltage electrical connector according to claim 6,
wherein the auxiliary locking member is provided with a locking surface, where the locking surface is engaging the primary locking member in the first position
wherein the locking surface is in direct engagement with the first arm section of the locking arm in the first position.

12. The high voltage electrical connector according to claim 1,
wherein the auxiliary locking member is arranged as a security screw movable between the first position and the second position.

13. The high voltage electrical connector according to claim 1,
wherein the stationary locking part is arranged as a locking protrusion or a locking groove in the second connector unit.

14. The high voltage electrical connector according to claim 1,
wherein the connector is provided with a visual indicator indicating that the high voltage is present in the connector.

15. The high voltage electrical connector according to claim 14, wherein the visual indicator is a light emitting diode (LED).

* * * * *